(12) United States Patent  
Qureshi et al.

(10) Patent No.: US 6,986,032 B2
(45) Date of Patent: Jan. 10, 2006

(54) SYSTEM AND METHOD FOR USING AN OPERATING SYSTEM DEFINED FIELD IN ACPI SUPPORT MULTIPLE OPERATING SYSTEMS

(75) Inventors: Shiraz A. Qureshi, Roseville, CA (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 10/212,718

(22) Filed: Aug. 7, 2002

(65) Prior Publication Data

US 2004/0030874 A1    Feb. 12, 2004

(51) Int. Cl.
G06F 9/24 (2006.01)
G06F 15/177 (2006.01)
G06F 3/00 (2006.01)

(52) U.S. Cl. ................. 713/1; 713/2; 710/10
(58) Field of Classification Search ........... 713/1
See application file for complete search history.

(56) References Cited

U.S. PATENT DOCUMENTS

| | | | |
|---|---|---|---|
| 6,081,890 A * | 6/2000 | Datta | 713/1 |
| 6,178,503 B1 | 1/2001 | Madden et al. | |
| 6,269,480 B1 * | 7/2001 | Curtis | 717/106 |
| 6,687,819 B1 * | 2/2004 | Aguilar et al. | 713/2 |
| 2002/0059473 A1 * | 5/2002 | Oshins et al. | 709/321 |

OTHER PUBLICATIONS

Advanced Configuration and Power Interface Spesification, Revision 2.0, Jul. 27, 2000.*
Search Report issued on Jan. 26, 2004 in counterpart foreign application in GB under application No. 317125.3.

* cited by examiner

*Primary Examiner*—Lynne H. Browne
*Assistant Examiner*—Stefan Stoynov

(57) ABSTRACT

A system and method for supporting multiple operating systems with mutually exclusive requirements on a single computer system, or platform. The operating system sets an ACPI variable to identify the operating system running on the platform. The system firmware automatically comes up with a common set of functionality to satisfy all operating systems that can run on the platform. The ACPI interpreter reads the OS identifying variable upon boot-up and uses it in conditional code that depends on the operating system to fully define the operation of the system component.

12 Claims, 3 Drawing Sheets

SYSTEM AND METHOD FOR USING AN OPERATING SYSTEM DEFINED FIELD IN ACPI SUPPORT MULTIPLE OPERATING SYSTEMS

BACKGROUND

Advanced Configuration and Power Interface (ACPI) is a specification that makes hardware status information available to an operating system in computers, including laptops, desktop, servers, etc. More information about ACPI may be found in the 500 page "Advanced Configuration and Power Interface Specification," Revision 2.0a, Mar. 31, 2002, cooperatively defined by Compaq Computer Corporation, Intel Corporation, Microsoft Corporation, Phoenix Technologies Ltd., and Toshiba Corporation. The ACPI specification was developed to establish industry common interfaces enabling robust operating system (OS)-directed motherboard device configuration and power management of both devices and entire systems. ACPI is the key element in operating system-directed configuration and power management (OSPM).

ACPI is used in personal computers (PCs) running a variety of operating systems, such as Windows™, available from Microsoft® Corporation, Linux, available as open source form a variety of vendors, and HP-UX, available from Hewlett-Packard Company. ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

Traditionally ACPI has been difficult to work with for a variety of reasons. First, ACPI is not written in the native assembly language of any computer system platform. Instead, ACPI has its own source and machine languages, i.e., ACPI Source Language (ASL) and ACPI Machine Language (AML), respectively. Because of its highly specialized use, there are relatively few ASL programmers; ASL has relatively few constructs because of its limited use. Furthermore, ACPI code is conventionally monolithic in its design. Consequently, this makes it difficult to port the ACPI code to other platforms or even to different configurations of the same platform. Thus, new ASL code needs to be written to work with newly-engineered platforms. The limited number of ASL programmers makes writing new code all the more problematic and costly.

ACPI is composed of both static and interpretable tables. At boot-up time, the system firmware (typically the BIOS, or Basic Input/Output System) constructs the static tables, which are consumed by the operating system. The interpretable tables are composed of AML, which is compiled and then merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional method lacks flexibility, and scalability, and requires considerable time to re-program to accommodate divergent system configurations.

For example, conventionally, ASL developers write ACPI code to specify a particular configuration of a platform or its variance. Unfortunately, if even a minor hardware change is performed, the design has to be modified. This requires that new AML code be written and new tables be merged into the system firmware. Thus, the conventional design is not portable or re-usable.

Furthermore, ACPI has conventionally required that a different system firmware ROM (Read Only Memory) or BIOS be used if there is a variance of the platform or if it supports more than one ACPI-aware OS system, where the OS systems have mutually exclusive ACPI requirements. A different system firmware ROM also had to be used if the same system is to support multiple operating systems. For instance, current art in personal computers uses the IA-32 instruction set. ACPI was primarily used by the Microsoft® family of operating systems, especially in systems with the IA-32 instruction set.

ACPI has been accepted by the various operating systems as the standard interface. A new instruction set architecture, IA-64, is being developed, but its advantages cannot be fully utilized with legacy ACPI code, or methods. The new Itanium® Processor Family, available from Intel® Corporation, uses the IA-64 instruction set. The ASL for each new processor in this family will need to be uniquely rewritten if current practices are utilized. Further, if multiple operating systems for a given processor, the ASL would need to be unique for each OS, as well.

The ACPI namespace is a hierarchical tree structure in OS-controlled memory that contains named objects. These objects may be data objects, control method objects, bus/device package objects, and so on. The OS dynamically changes the contents of the namespace at run-time by loading and/or unloading definition blocks from the ACPI Tables that reside in the ACPI BIOS. All the information in the ACPI namespace comes from the differentiated system description table (DSDT), which contains the differentiated definition block, and one or more other definition blocks. In the current art, an OEM (original equipment manufacturer) must supply a DSDT to an ACPI-compatible OS, which supplies the implementation and configuration information about the base system. The OS always inserts the DSDT information into the ACPI namespace at system boot time and never removes it.

Another ACPI construct is the secondary system description table (SSDT). SSDTs are a continuation of the DSDT. Multiple SSDTs can be used as part of a platform description. After the DSDT is loaded into the ACPI Namespace, each secondary description table with a unique OEM Table ID is loaded. This allows the OEM to provide the base support in one table, while adding smaller system options in other tables. Additional tables can only add data; they cannot overwrite data from previous tables.

The ACPI specification, defines an operating system defined variable \_OS as an object that evaluates to a string that identifies the operating system. In robust OSPM implementations, \_OS evaluates differently for each OS release. This may allow AML code to accommodate differences in OSPM implementations. This value does not change with different revisions of the AML interpreter. This variable is currently not populated by all operating systems, and when it is used, is not used in a standard way.

A single computer system of the prior art that can operate with different operating systems will typically have a unique BIOS, or firmware, loaded which is specific on only one operating system. Loading a different OS requires the firmware to swapped out or reprogrammed.

SUMMARY

A system and method for supporting multiple operating systems with mutually exclusive requirements on a single computer system, or platform. The operating system sets the ACPI variable \_OS to identify the operating system running on the platform.

The system firmware automatically loads a common set of functionality to satisfy all operating systems that can run on the platform. The ACPI interpreter reads the \_OS variable upon boot-up.

The ACPI source code is written to accommodate the possibility of more than one operating system. The \_OS variable is used as a condition to customize the system for the currently running OS. The ACPI still has to be written in the source language and then compiled into the ACPI machine language. There is additional logic imbedded in the ASL code that uses the identifying information with the operating system.

DESCRIPTION OF THE DRAWINGS

The detailed description will refer to the following drawings, wherein like numerals refer to like elements, and wherein.

DETAILED DESCRIPTION

ACPI is an IA-32 instruction set concept that is still used for the new IA-64 instruction set. ACPI is a way for abstracting hardware manipulation and configuration data to define the configuration of the hardware for operating system (OS) and firmware interaction. ACPI is a specification industry standard. Currently, the major three commercial personal computer (PC) operating systems, i.e., Linux, HP/UX and Windows™, use ACPI in IA-32 space and will run using ACPI in the new IA-64 space. Upon system boot, the firmware powers up and determines the system configuration. The system is initialized, if it needs to be, and then the operation is handed over to the OS, i.e., boots up the OS. When a system is booted up, it must have knowledge of the different platform configurations. ACPI is a specification for the hardware configuration that has interface objects and a namespace in order to define the divergent platform configurations.

It is desirous to make the creation of ACPI code for new platforms more structured, and to make the ACPI code platform and operating system independent. This can be achieved using architected approaches with modular design for ACPI code. This method of ACPI design is not currently used, and in fact, is frowned upon by developers.

Another issue with previous ACPI designs is that ACPI developers had to fully describe any given platform or operating system variance using ASL. The design did not allow for portability or re-usability if even minor hardware changes were performed, which included loss of a hardware component during boot-up. In addition, the same ROM could not be employed by a variance of the given platform type or if that same system was supporting multiple operating systems.

The ACPI namespace describes the hierarchy of a computer system in a logical way. For example, When the OS consumes the namespace, it gets a picture of what the hardware looks like underneath. Thus, if the OS needs to get a resource for a given hardware component, or if it needs to know how to access a component, it looks to the namespace. For example, if the OS needs to put the machine to sleep, there is an object that will identify how to put a device to sleep. The OS uses the interfaces or objects defined in the namespace to manipulate the hardware. This is the function of ACPI.

An advantage of the present system and method is that it enables various operating systems to run using a common or generically programmed firmware. A currently unfulfilled desire of present firmware is that it is usable in only one configuration of one platform with one OS. The present system and method allows for a system firmware that will operate with all three major OS's at the same time. Thus, the firmware would not need to be upgraded/modified each time the OS is changed. This requires the OS to have knowledge of what OS is running on the platform at boot time, among other things.

Figure 1:
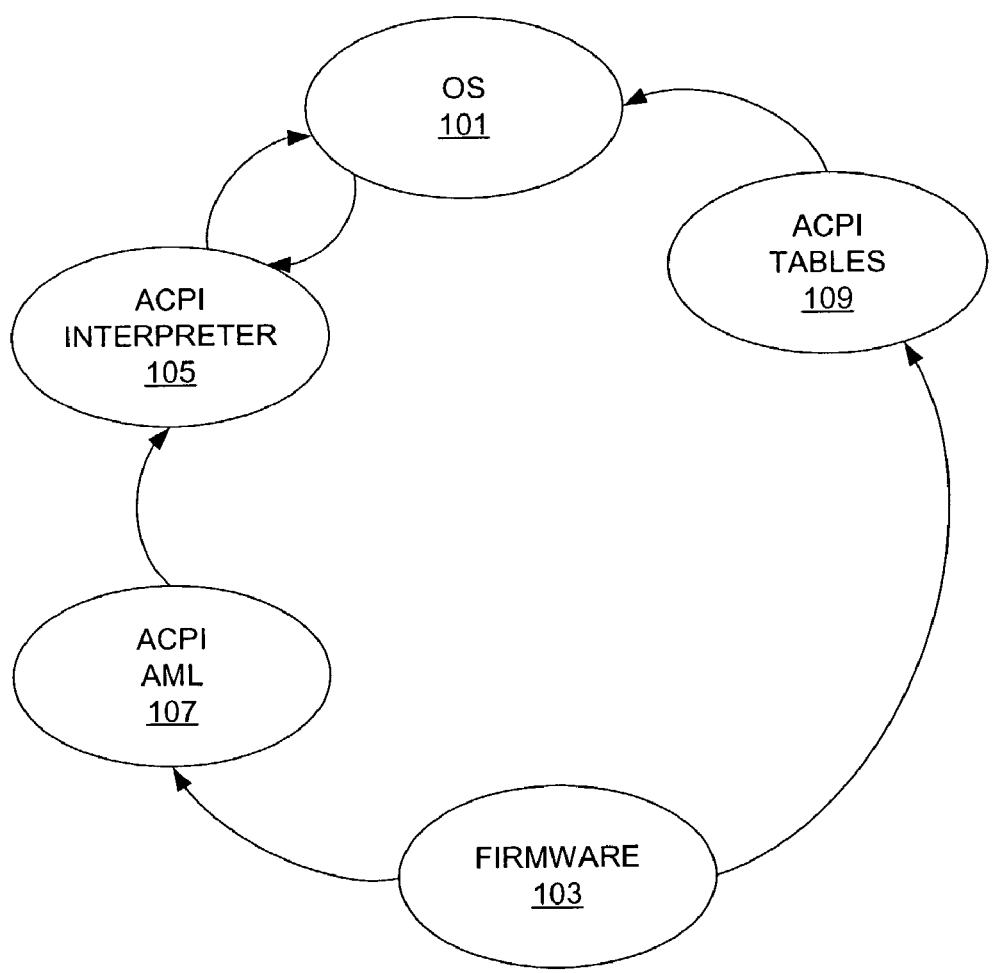
FIG. 1 shows a block diagram depicting the interaction between the OS and the ACPI interpreter and ACPI tables.

Referring now to the drawings, and in particular to FIG. 1, there is shown a block diagram depicting the interaction between the OS and the ACPI interpreter and ACPI tables. During normal system operation, the OS 101 needs to access or operate some hardware function. To do this, it must have information about how the hardware operates. Upon boot-up, the system firmware 103 creates the ACPI namespace, as described above, and populates ACPI tables 109 with the system component information. When the OS 101 attempts to access or operate the hardware, it runs ACPI AML code 107 through the ACPI interpreter 105 to retrieve the system information. In systems of the prior art, the AML would be hard coded for a specific operating system.

The ACPI table consists of both static and dynamic tables. The dynamic tables accommodate hot-pluggable devices, for instance. When the system firmware 103 is booting up, it runs its corresponding AML 107. It also sets up architected static tables 109. The tables are architected and the firmware will create those tables in memory, and them leave them there (ACPI tables 109). When the OS takes control, it automatically knows how to find the ACPI tables 109, retrieves them, and consumes them. These ACPI tables 109 are static in nature. For a given boot, the static ACPI tables 109 will stay as they are without changing.

The firmware 103 also sets up the dynamic portion of ACPI AML 107. When the OS 101 starts up, it starts up the ACPI interpreter 105. The interpreter 105 consumes the AML 107. This AML 107 is partially static, as described above, and partially dynamic in nature. A hot-pluggable card may be added to the system. The hot-pluggable device will have standard objects associated with it, for instance _EJ0 (device removal object, e.g., eject object) and _Lxx (control methods, e.g., insertion object). When the hot-pluggable card is added, it generates an instruction on how to handle it. There is an AML byte code written and executed for that hot plug event. The event is handled and a status is then given back to the OS. In this way, the OS does not have to know how certain system hot-plug operations have to happen. The firmware designers write the hot-plug definition in ASL, compile the code, and it becomes a part of the AML 107. The OS executes and determines that it needs to, for instance, eject a hot-pluggable device. The OS sends instructions to the ACPI interpreter 105, and then manipulates the hardware. In this example, the device is ejected, and the OS waits for a status to be returned from the operation.

Figure 2:
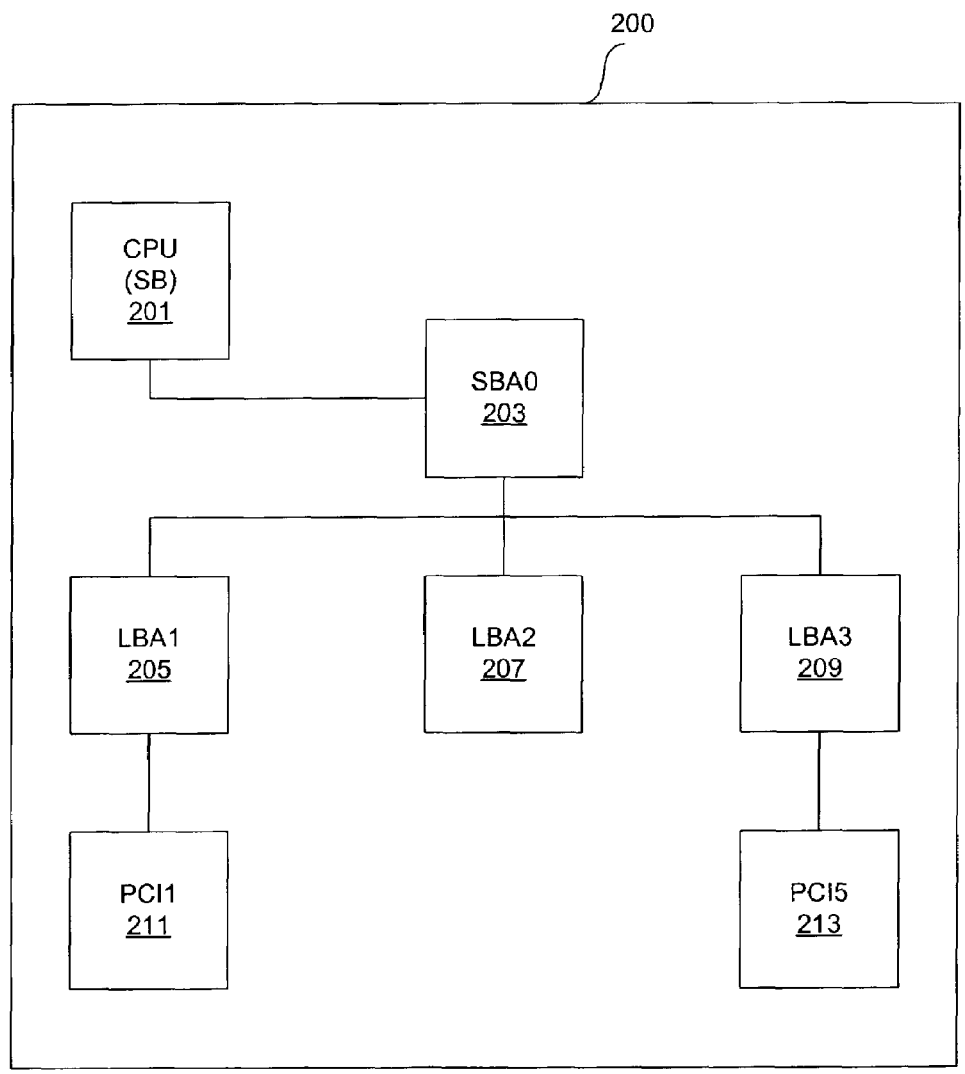
FIG. 2 shows an exemplary system requiring namespace definition in order for the OS to be able to interact with the hardware via the ACPI interpreter.

The ACPI tables define the namespace of the loaded system components. Referring now to FIG. 2, there is shown an exemplary system 200 requiring namespace definition in order for the OS to be able to interact with the hardware via the ACPI interpreter. The system has a CPU 201, connected to a system bus adapter, SBA0 203. The system bus adapter 203 is connected to three local bus adapters, LBA1 205; LBA2 207; and LBA2 209. LBA1 205 has a PCI slot, PCI1 211. LBA3 209 has a PCI slot, PCI5 213. In order for the operating system to function properly, these system components must be described in an ACPI namespace so that the ACPI interpreter can provide an interface between the OS and the hardware.

Figure 3:
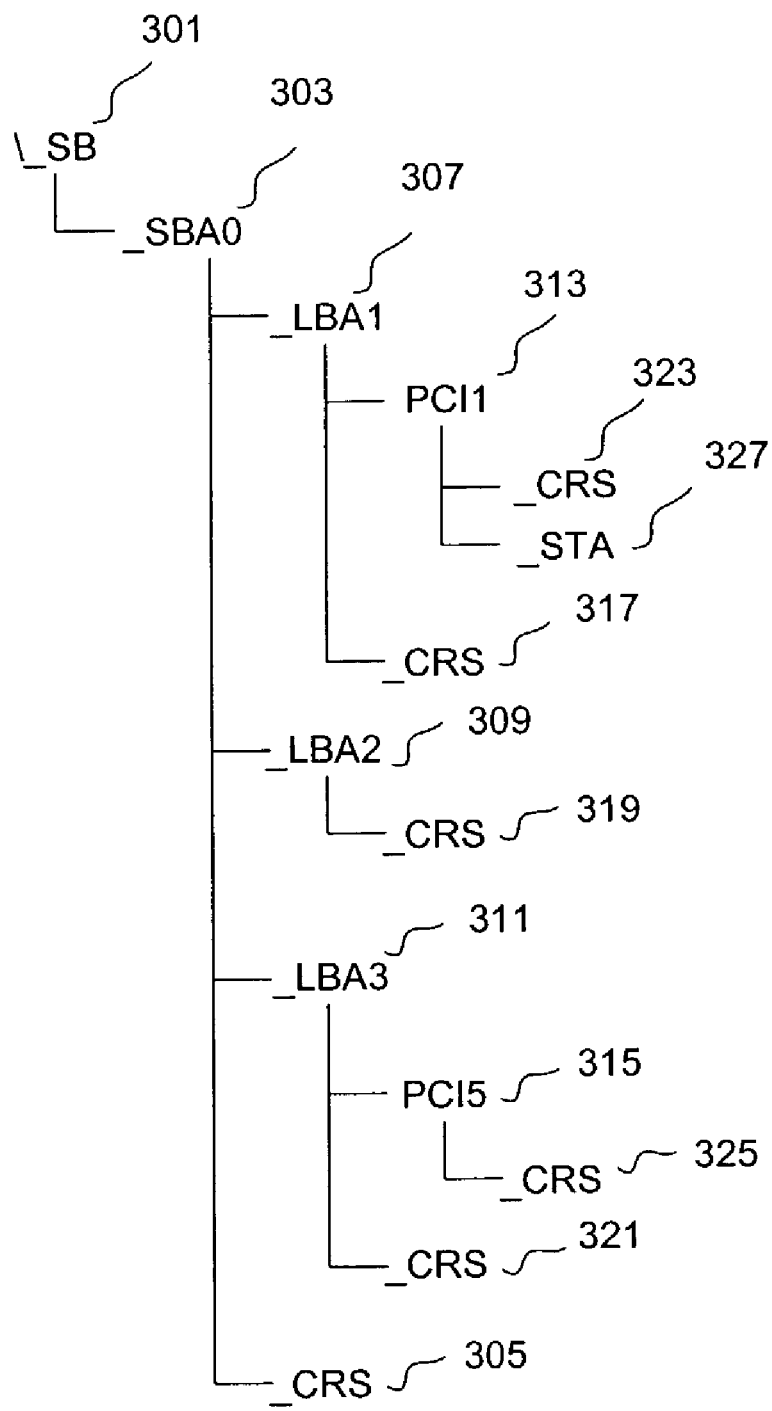
FIG. 3 shows an exemplary and simplified ACPI namespace definition, which corresponds to the system in FIG. 2.

Referring now to FIG. 3, there is shown an exemplary and simplified ACPI namespace definition, which corresponds to the exemplary system in FIG. 2. The system bus _SB of the CPU 301 has a child system bus adapter _SBA0 303. The system bus adapter _SBA0 303 has children _CRS (current resource settings) 305, and three local bus adapters: _LBA1 307, _LBA2 309, and _LBA3 311. Local bus adapter _LBA1 307 has a PCI slot child PCI1 313 and local bus adapter _LBA3 311 has a PCI slot child PCI5 315. The local bus adapters _LBA1 307, _LBA2 309, and _LBA3 311 also have other children associated with them. Each as a _CRS (current resource status) 317, 319, and 321. The PCI slots also have _CRS 323 and 325. _PCI1 also has an additional status _STA 327.

The ACPI specification also defines the \_OS variable to identify the operating system running on the platform. The system firmware automatically boots up with a common set of functionality to satisfy all operating systems that can run on the platform. The ACPI interpreter reads the \_OS variable upon boot-up. This variable was also defined for the IA-32 instruction set, but was not widely used by all operating systems. Currently, only the Windows™ operating system populates this field regularly.

In the current method, the ACPI source code is written to accommodate the possibility of more than one operating system. The \_OS variable is used as a condition to customize the system for the currently running OS. The ACPI still has to be written in the source language and then compiled into the ACPI machine language. But there is additional logic imbedded in the code that uses the information with the operating system which is currently only used by Windows™ now.

For instance, the maximum allowable time to complete an eject operation might vary depending on the OS. Assume that Windows™ allows 3 seconds, LINUX allows 10 seconds, and HP-UX allows 15 seconds to complete an eject operation. If the firmware did not take into account the OS currently running and used a default of 5 seconds, then the system would fail, or at least get an error status for a 10 second eject, when Linux is running. The present method enables the system to accommodate for varying operating systems by using the \_OS variable.

The ASL is designed to test for the \_OS variable. A simplified example of how the \_OS variable is used is shown in program design language (PDL) below:

```
IF ( (\_OS == WINDOWS AND EJECT_TIME <=3 Sec) OR
     (\_OS == LINUX AND EJECT_TIME <=10 Sec) OR
```

-continued

```
     (\_OS == HP-UX AND EJECT_TIME <=15 Sec) ) THEN
         STATUS = SUCCESS
ELSE
         STATUS = FAIL
ENDIF
```

If the eject time is less than or equal to the OS-defined threshold, i.e., 3, 10, or 15 seconds, then the status is returned successfully to the OS. If the eject time takes longer than the allowable threshold, then the status is returned as a failure. ASL programmers do not presently use conditionals based on the operating system type, but hard-code the ASL to a specific operating system.

The present method operates in an optimal mode when the OS populates the \_OS variable. However, a default mode can be coded in the event that the OS has not populated the \_OS variable, or if the value of the \_OS variable is unknown. For instance, the PDL above would now be coded as:

```
IF ( (\_os == WINDOWS AND EJECT_TIME <=3 Sec) OR
     (\_os == LINUX AND EJECT_TIME <=10 Sec) OR
     (\_os == HP-UX AND EJECT_TIME <=15 Sec) OR
     (\_os == undefined AND EJECT_TIME <=10 Sec) ) THEN
         STATUS = SUCCESS
ELSE
         STATUS = FAIL
ENDIF
```

In this way, any number of operating systems can run on a platform without having to re-code the ASL. Another example that highlights the ability to hide resources is as follows: Assume that Windows™ cannot handle more than 250 PCI buses in the computer system, while Linux can support an arbitrary amount. When the ACPI interpreter loads up the namespace, it may have 300 PCI buses described. The AML discovers that the OS running is Windows™. Because 300 is more than the OS can handle, the extra 50 PCI buses are unloaded from the namespace and the Windows™ system is able to Boot.

Having described preferred embodiments of a novel method to for populating and using an existing variable as a conditional when interpreting ACPI code, (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for using an operating system-defined field to support multiple operating systems with mutually exclusive requirements, where an operating system is running on a computer system, comprising:

storing an operating system identifier, the operating system identifier being accessible during system boot-up; and providing the operating system identifier to a system component definition interpreter, wherein operation of the system component definition interpreter is conditional on the operating system identifier.

2. The method as recite in claim 1, further comprising providing a default value for the operating system identifier to accommodate instances when the operating system identifier is undefined after system boot-up.

3. The method as recited in claim 1, wherein the system component definition interpreter is an advanced configuration and power interface (ACPI) interpreter, the ACPI interpreter interpreting ACPI machine language (AML), and wherein the operating system identifier is an ACPI defined variable, .backslash._OS.

4. The method as recited in claim 3, wherein the operating system is selected from the group of operating systems consisting of Windows.TM., Linux and HP-UX.

5. The method as recited in claim 1, further comprising running an operating system on a computer system, wherein the operating system interacts with the system component definition interpreter when a system component is utilized by the operating system.

6. The method as recited in claim 5, further comprising populating a namespace during system boot-up, the namespace defining system components present in the computer system, wherein the namespace is accessible by the operating system and the system component definition interpreter.

7. The method as recited in claim 1, wherein the computer system uses instruction set IA-64.

8. A multi-operating system computer system having an IA-64 instruction firmware, comprising:

a central processing unit (CPU);

a memory bus connecting the CPU with at least one system component;

system firmware connected to the CPU for booting up the computer system, the system firmware populating a common namespace defining the at least one system component, wherein the common namespace further comprises an operating system identifier;

an interpreter interface for bridging the operating system to the system components, the interpreter interface accessing the common namespace and the operating system identifier; and a current operating system using the interpreter interface when system component interaction is required, wherein the interpreter interface operation is conditional on the operating system identifier.

9. The system as recited in claim 8, wherein the operating system identifier is set to a pre-defined type when the operating system identifier is undefined after system boot-up.

10. The system as recited in claim 8, wherein the interpreter interface is an advanced configuration and power interface (ACPI) interpreter, the interpreter interpreting ACPI machine language (AML), and wherein the operating system identifier is an ACPI defined variable, .backslash._OS, and wherein the common namespace defines ACPI tables.

11. The system as recited in claim 10, wherein the current operating system is selected from the group of operating systems consisting of Windows.TM., Linux and HP-UX.

12. The system as recited in claim 8, wherein the computer system uses instruction set IA-64.

* * * * *